(12) United States Patent
Shaw et al.

(10) Patent No.: US 6,733,365 B1
(45) Date of Patent: May 11, 2004

(54) METHOD AND APPARATUS FOR HARD MACHINING

(75) Inventors: Milton C. Shaw, Tempe, AZ (US); Amitabh Vyas, Wichita, KS (US)

(73) Assignee: Arizona Board of Regents, Tempe, AZ (US)

( * ) Notice: Subject to any disclaimer, the term of this patent is extended or adjusted under 35 U.S.C. 154(b) by 153 days.

(21) Appl. No.: 09/554,319

(22) PCT Filed: Aug. 11, 1998

(86) PCT No.: PCT/US98/16682
§ 371 (c)(1),
(2), (4) Date: May 10, 2000

(87) PCT Pub. No.: WO99/07507
PCT Pub. Date: Feb. 18, 1999

Related U.S. Application Data
(60) Provisional application No. 60/055,479, filed on Aug. 12, 1997.

(51) Int. Cl.[7] .............................................. B24B 49/00
(52) U.S. Cl. ........................ 451/21; 451/10; 451/164; 451/324; 451/426
(58) Field of Search ................................. 451/242, 243, 451/162–164, 10, 11, 319, 21, 172, 552, 41, 72, 48, 49, 426, 324

(56) References Cited

U.S. PATENT DOCUMENTS

| | | | | |
|---|---|---|---|---|
| 1,381,593 A | * | 6/1921 | Rollins | 451/179 |
| 4,226,053 A | * | 10/1980 | Inoue | 451/179 |
| 4,501,092 A | * | 2/1985 | Archibald | 451/179 |
| 4,593,444 A | * | 6/1986 | Kavthekar | 451/52 |
| 4,693,157 A | * | 9/1987 | Looser | 83/431 |
| 4,908,997 A | * | 3/1990 | Field, Jr. et al. | 451/5 |
| 5,006,685 A | * | 4/1991 | Hatano et al. | 451/72 |
| 5,097,634 A | * | 3/1992 | Hulme | 451/48 |
| 5,346,336 A | * | 9/1994 | Rescigno | 407/104 |
| 5,556,243 A | * | 9/1996 | Bory | 144/135.2 |
| 5,564,966 A | * | 10/1996 | Nishioka et al. | 451/41 |
| 5,761,976 A | * | 6/1998 | Bailey | 82/100 |
| 6,202,770 B1 | * | 3/2001 | Jurewicz et al. | 175/428 |

\* cited by examiner

*Primary Examiner*—Hadi Shakeri
(74) *Attorney, Agent, or Firm*—Gallagher & Kennedy, P.A.; Thomas D. MacBlain

(57) ABSTRACT

A hard machining process uses a cylindrical tool (21) of ceramic or other hard machining material of comparatively low cost that provides a circular cutting edge to be engaged in cutting relation with hardened workpiece (20) to be machined. As tool cutting edge wear occurs, the tool (21) is rotated through a small angle to bring into contact with the workpiece (20) a fresh portion of the cutting edge. It is not necessary to rotate that tool (21) sufficiently to effect replacement of the entire cutting edge portion in engagement with the tool. Sufficient angular movement of the tool is made to replace that of the cutting edge that has the greatest effect on the finish of the machined workpiece (20), which is the cutting location where the removed chip is thinnest.

30 Claims, 3 Drawing Sheets

METHOD AND APPARATUS FOR HARD MACHINING

The present application claims priority rights based on U.S. Provisional Application Serial No. 60/055,479 filed Aug. 12, 1997.

INTRODUCTION

This invention relates to a method and apparatus for hard machining a hardened workpiece, and more particularly to such methods and apparatus in which the cutting tool is moved to bring a fresh, unworn portion of a cutting edge into cutting engagement with the workpiece.

BACKGROUND OF THE INVENTION

There is growing interest in a machining operation known as "hard turning" or "hard machining." This involves removing material from a workpiece in a machining operation with the workpiece in a hardened state. In the past, it has been customary to produce parts, such as ball and roller bearings, gears, cams, etc., that must be hardened to decrease wear, by the following sequence of steps:

rough machine a part in its soft state, heat treat the part, and rough and finish grind the part to provide desired accuracy and surface finish.

By contrast, in hard machining, the hardened part is machined to produce a part in a single operation instead of the more costly sequence indicated above.

Hard machining has become an option with the appearance of improved tool materials such as cubic boron nitride or polycrystalline cubic boron nitride (hereinafter "CBN" or "PCBN," respectively) and ceramics. The CBN or PCBN is very expensive (comparable to diamond in this respect), while the latter, hard-cutting ceramics, have a much shorter tool life, but a much lower cost. It would be possible to use the less expensive ceramic tool material, a superior grade of carbide or other low cost tool material capable of hard machining, provided the nonproductive tool changing time could be reduced and the tool material could be used more efficiently. As used herein, then, a hard machining cutting tool is one having a cutting edge of one of the aforesaid materials capable of hard machining, to wit CBN, PCBN, hard-cutting, ceramics, superior grade carbide or other tool material capable of hard machining.

SUMMARY OF INVENTION

An improved method and apparatus for combining a comparatively coarse, roughing cut at a high removal rate (in a location of coarse cutting) and a finishing cut at a low removal rate (in a location of finishing cutting) are employed that are useful in hard turning operations. The new method and apparatus make it possible to use a much less expensive tool material such as ceramic in place of PCBN that is now used in hard turning operations. This is accomplished by offsetting the lower tool life of a lower cost tool relative to that of a PCBN tool by providing the tool with an extended cutting edge extending along a path of translation and moving the tool to move the cutting edge along the path of translation so that a fresh cutting edge portion is brought rapidly into cutting position. In particular, in a preferred embodiment of the invention, a fresh cutting edge portion is moved into position to replace the portion of a cutting edge being used for the finishing cut, which finishing portion of the cutting edge is less than the entire portion in engagement with the workpiece.

In a specific preferred embodiment, the method and apparatus of the invention achieves the above objectives by:

using a large diameter cylindrical tool of ceramic having a large number of new cutting edges (or cutting portions of the continuous circular cutting edge) along the periphery of the face of a single cylindrical tool, and reducing the nonproductive downtime to change tools to essentially zero by merely rotating the cylindrical tool through a small arc when a new cutting edge is required.

The substitution of a ceramic tool material for CBN or PCBN has an important thermal advantage in the combined roughing/finishing cut employed in hard turning. CBN has a much higher thermal diffusivity than does a ceramic. While this is advantageous relative to tool wear in conventional machining applications, this is not the case for the type of cut employed in hard turning as shown in FIG. 1, where is the depth of cut and f is the feed per revolution (fpr). In this case, a chip region of large thickness ($t_r$) responsible for most of the removal (and hence temperature rise) is contiguous with the finishing region of the chip having low thickness ($t_f$) (and hence low removal rate and low temperature rise). The finish of the surface produced is influenced primarily by the thickness of the chip $t_f$, while the bulk of the material is removed in the region where the chip thickness is $t_r$. The bulk of the heat generated and hence most of the tool wear will be in the $t_r$ region. Relative to surface finish, tool wear in the $t_f$ (finishing cut) region is more important than that in the $t_r$ (comparatively coarse cut) roughing region.

Surface finish deterioration, the rate of which increases with temperature, determines the useable tool life in hard turning. It is therefore important that the higher temperature in the roughing region (region of large $t_r$) not flow into the finishing region (region of low $t_f$) to reduce tool life. The poorer thermal properties of ceramic relative to CBN is advantageous in this particular case. Also, a larger tool radius can mean a large arc of tool engagement and a longer heat travel distance from the hottest portion of the roughing region to the comparatively cooler finishing region.

DESCRIPTION OF THE DRAWINGS

The invention will be more readily understood from the description of a preferred embodiment that follows and from the diagrammatic figures of the accompanying drawings.

In the drawings.

DETAILED DESCRIPTION OF INVENTION

Figure 1:
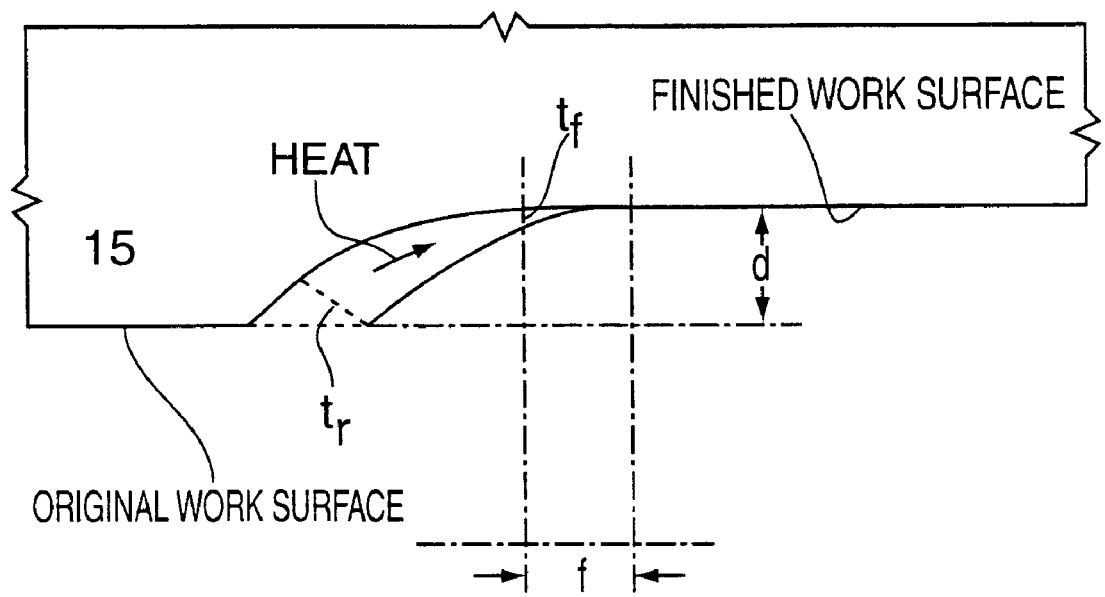
FIG. 1 is a fragmentary diagrammatic illustration showing the shape of a chip being formed when cutting is confined to the nose radius of a tool.
Figure 2:
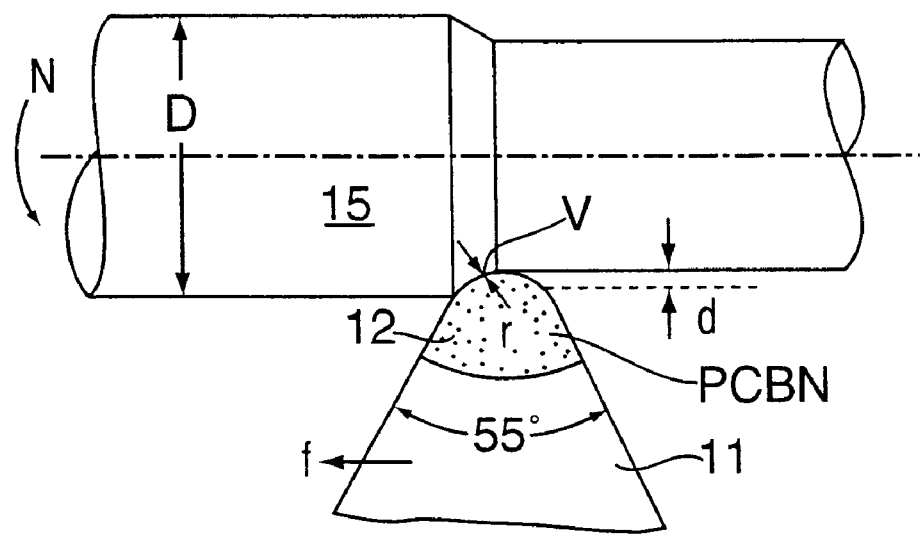
FIG. 2 is a fragmentary diagrammatic illustration showing a conventional hard turning operation with only a small portion of a tool face consisting of PCBN.

Turning to FIG. 2, at present hard turning is performed using a tool 11 having an expensive polycrystalline CBN insert 12. PCBN is a composite of small single crystal particles bonded together by sintering. A typical application is shown in FIGS. 1 and 2 where:

"f" is the feed rate, inches per rotation (hereinafter "ipr"),

"d" is the depth of cut, inches (hereinafter "in."),

"N" are the rotations per minute (hereinafter "rpm" of a workpiece 15,

"D" is the workpiece diameter, in., "V" is the cutting speed defined as $\pi DN$ (in. per minute), perpendicular to the paper, and "r" is the radius (in.) of the tool insert 12.

Figure 3:
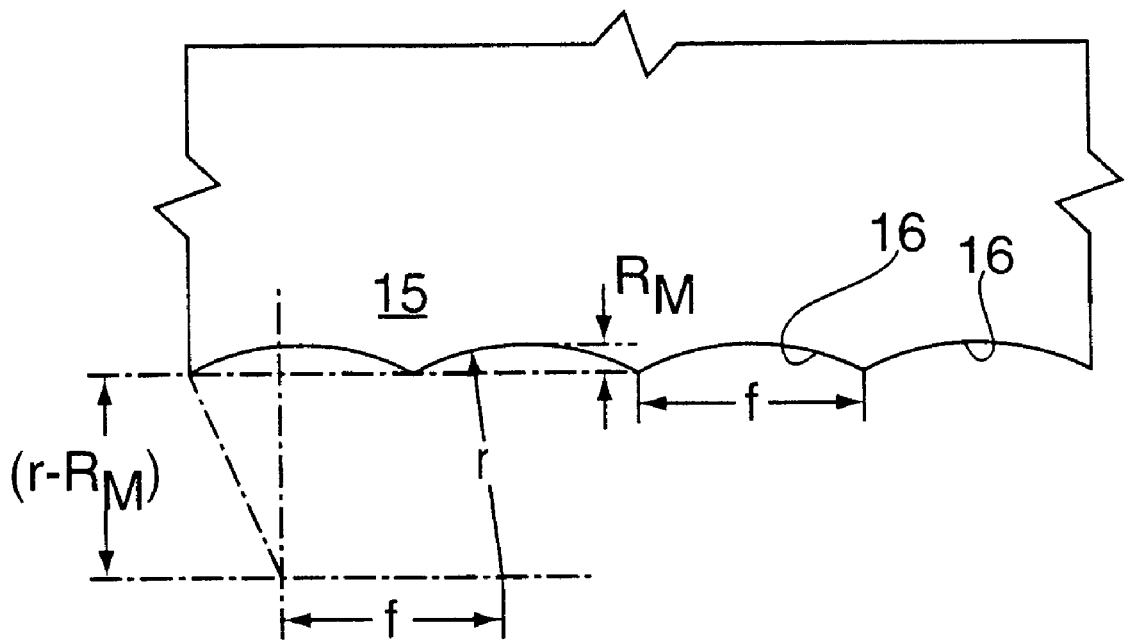
FIG. 3 is a fragmentary diagrammatic illustration showing the scallop left behind on the finished surface where the depth of the scallop ($R_m$) is the peak-to-valley roughness which depends upon the radius at the tool tip and the feed per revolution (f).

For a sharp tool, and a reasonably rigid machine, the surface finish depends primarily upon a scallop 16 generated by the nose of the tool having a radius r. FIG. 3 shows this scallop 16 with feed (f) greatly magnified relative to r, and where $R_m$ is the depth of the scallop. $R_m$ is called the peak-to-valley roughness. To a good approximation:

$$R_m = f^2/8r \quad (1)$$

Figure 4:
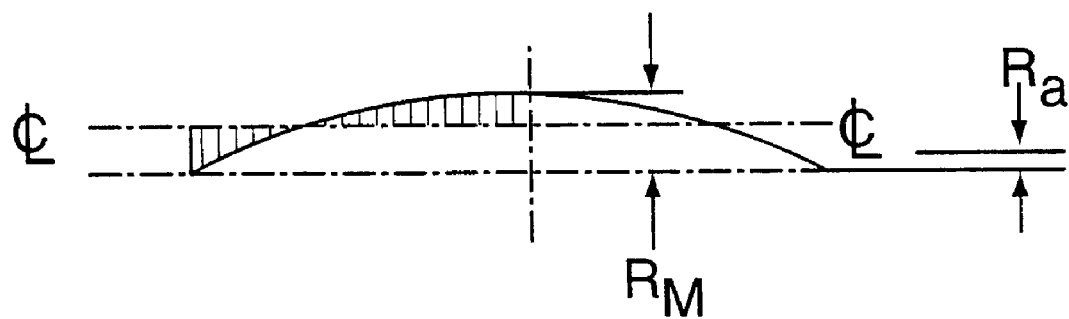
FIG. 4 is an enlarged diagrammatic illustration of a portion of the scallop of FIG. 3 showing the relation between peak-to-valley roughness ($R_m$) and centerline-average-roughness ($R_a$) where the centerline is located so that the areas above and below the centerline are equal, and $R_a$ is the mean distance from the centerline to the surface of the scallop over one feed distance f.

Surface roughness is usually measured by the motion of the stylus of a measuring instrument perpendicular to the surface as it moves across the surface. In the USA, finish is expressed in terms of the arithmetic average deviation of a surface trace from its centerline ($R_a$). The centerline of the exaggerated scallop 16 is shown in FIG. 4, and the $R_a$ value for this scallop is $R_m/4$ to a good approximation. Therefor, $$R_a = f^2/(32r), \text{ microinches.} \quad (2)$$

This is the theoretical roughness. The actual measured roughness of a hard turned surface generated by the nose radius of a sharp tool will be very close to this value (less than a factor of 2 greater due to wear, tool chatter, etc.). Thus, the surface finish produced by a tool cutting completely on the insert radius will be independent of the depth of cut (d) and will depend only on the feed (f) and insert radius (r).

To obtain a suitable finish in hard turning f must be small. However, a small value of f requires a long time to make a cut of a required axial length and hence reduces productivity and increases cost. If r is increased from the normally used value of 0.03 in. to one in., the value of f may be increased by a factor of 5.8 to obtain the same $R_a$. This is the first reason for greatly increasing r (increased feed rate to give the same finish, hence less production time and cost).

Figure 5:
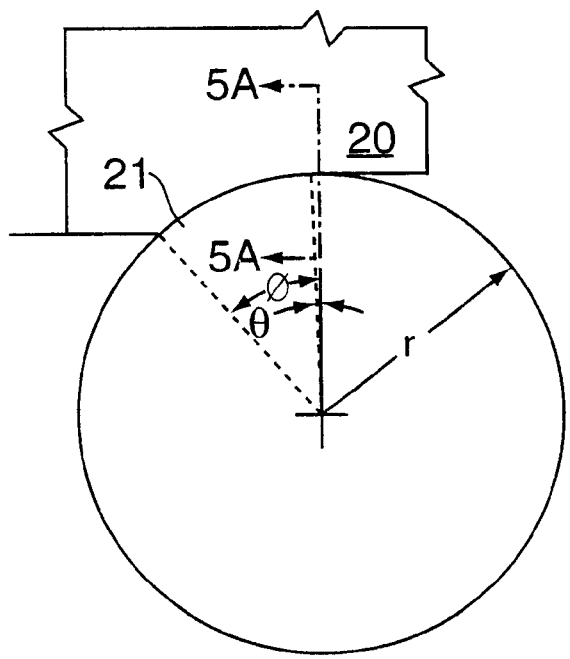
FIG. 5 is a diagrammatic illustration showing the relation between a cylindrical tool of large radius and the work in accordance with the present invention.
Figure 5A:
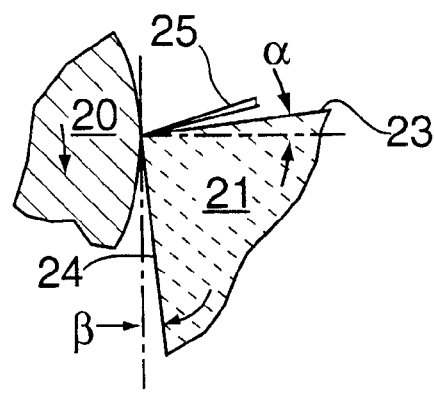
FIG. 5A is a diagrammatic, fragmentary cross-sectional view along the line A—A of FIG. 5.

The second reason for increasing r is to use the tool material more efficiently. FIGS. 5 and 5A show a cylindrical tool 21 of large radius r. The tool 21 has a tool face 23 and a tool flank 24, both as seen in FIG. 5A. The tool 21 is mounted with its axis inclined to provide a negative rake angle $\alpha$ and a positive clearance angle $\beta$ from a workpiece 20. As seen in FIG. 5, only a small portion of the edge formed by the tool face and the tool flank will be in use. In order to remove a chip 25 of sufficient material to provide a finished surface of good integrity and finish the required depth of cut d will normally be several times the feed f. A conservative value would be ten (i.e. d=10f).

If an $R_a$ of 10 $\mu$in. (0.25 um.) in hard turning is required (before superfinishing), and r=1 in. (2.54 cm.), then from equation 2, a feed of about 0.018 ipr (0.046 cm./r) would be required. For a conservative ratio of $R_a$ actual to $R_a$ theoretical of 2, the required feed would be $0.018/2^{0.5}=0.013$ ipr (0.033 cm./r). If the depth of cut is ten times this value, then d=0.13 in. (0.033 cm.) The corresponding arc of contact between tool 21 and work 20 would be $\Phi=\cos^{-1}[1-0.13]=30°$.

If the tool 21 is rotated 30° every time a tool change is indicated, then there would be 360°/30°=12 tool changes per cylindrical tool. It is only a ,mall portion $\theta$ of the arc of contact $\phi$ that determines the finish as compared to the portion of the arc of contract that provides the initial comparatively coarse cutting at the leading contact location. Therefore, it would not be necessary to have a new cutting edge extend over this total area of contract. FIG. 3 shows the scallop corresponding to a given $R_M$ of 40 $\mu$in (1 um.) (=4$R_a$). The critical arc of tool-work contact in this case would be $\theta=\cos^{-1}[1-40\times10^{-6}]=0.5$. According to this, it would be possible to have 360/0.5=720 tool changes per cylindrical Sol. Theoretically, the number of new cutting edges per cylindrical tool 21 should be between 12 and 720. A practical value might be 200 for this example.

If the tool in the above example has a radius of 0.5 in. (1.27 cm.) instead of 1 in. (2.54 cm.), then the following results would obtain:

A required $R_a$ of 10$\mu$in. (0.25 um.), a required feed rate (f) equal to 0.0126 ipr (0.032 cm./r) (theoretically) or 0.009 ipr (0.023 cm./r) (practically, i.e. $0.0126/2^{0.5}$ ($0.032/2^{0.5}$)), a depth of cut (d) equal to 10f or 0.09 in. (0.23 cm.), a total arc of contact equal to $\cos^{-1}(1-0.09/0.5)$ or 35°, a minimum tool change per cylindrical tool of 10, based on complete arc of contact $\Phi$, a critical arc $\Theta$ equal to $\cos^{-1}(1-40\times10^{-6}/0.5)$ or 0.72°, and a max tool change per cylindrical tool of 360/0.72 or 500.

Even at smaller tool radii (⅛ inch (0.32 cm.) for example), the advantages of the invention can begin to be seen with a feed rate in excess of 0.003 or 0.004 in. per revolution (0.0076 or 0.010 cm. per revolution (cm./r)). Likewise, when the arc of engagement of the tool edge and workpiece exceeds as small an angle as even 10° and the incremental replacement of cutting edge is accomplished by a movement of less than 5°, the appreciable increase in tool usage between replacements or regrinding can be appreciated. Moreover, when the angular movement effected by the tool drive for movement of a fresh unworn portion of cutting edge into position is 1° or less, very significant increases in tool usage times are observed.

Preferably, in order to take full advantage of the multiple cutting edge aspect of a relatively large cylindrical tool, the cutting edge should be as perfectly circular as possible and the tool rotation should be performed rapidly and without shift of the center of rotation. There are many ways in which this might be accomplished. From the foregoing, it can be seen that even engagement of the tool cutting edge over a total arc length corresponding to $\Phi=10°$ and rotation of the tool through an angle $\Theta$ of no more than 5° will result in considerably extended use of the ceramic tool by 72 or more incremental movements of fresh cutting edge into the finish cut portion of the arc of tool engagement.

Figure 6:
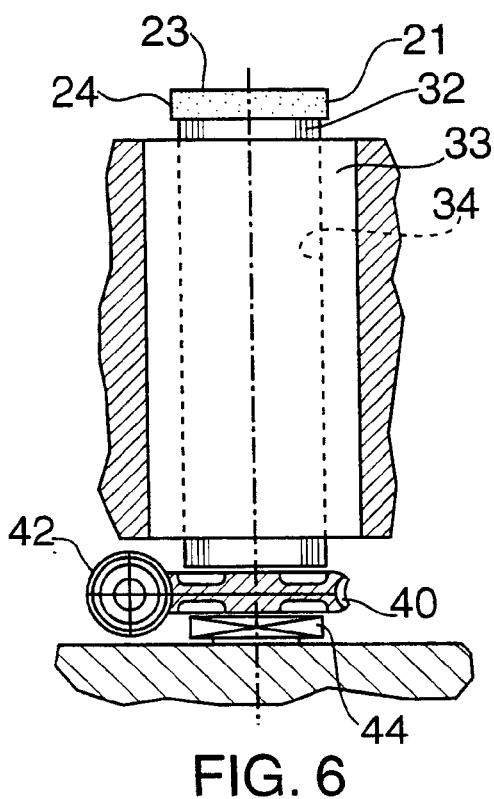
FIG. 6 is a diagrammatic representation of an apparatus providing one means of rapidly indexing the cutting edge of the cylindrical tool of FIG. 5 each time a new surface is to be provided that eliminates the adverse effects of tool wear on the geometry of the surface left behind on the workpiece.
Figure 6A:
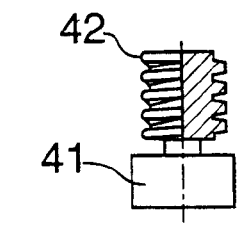
FIG. 6A is a diagrammatic top plan view, partially in section of a stepper motor and driven worm gear for effecting the rapid indexing of the apparatus of FIG. 6.

One application of the above principle is illustrated in FIG. 6. Here the tool 21 is a disc-shaped ceramic material (or other comparatively low cost tool material suitable for hard machining). The tool 21 is attached to the top of a metal piston 32 restrained by a retaining member 33 with a lapped bearing surface 34, with very small clearance. After the ceramic tool 21 is attached, the tool face 23 and tool flank 24 surfaces are diamond ground with the piston 32 in place in the lapped surface 34 of the retaining member 33. The tool face 23 is generally perpendicular to the axis of the cylindrical piston 32. The tool flank 24 is substantially perpendicular to the tool face, but may be varied to present the correct cutting edge with respect to the workpiece.

The tool 21 is contacted with the workpiece (not shown is FIG. 6). The tool 21 is rotated as needed to maintain a cutting surface capable of producing the required finish. After the entire edge of the cylindrical tool has been utilized, it may be possible to regrind the tool face and tool flank surfaces with the piston in place in the lapped retaining member 33 to obtain a whole new set of cutting edges.

A means for rapid and precise rotary indexing and prevention of rotation of the cylinder during cutting can also be provided. This is achieved by a gear 40 attached to the bottom of the piston 32. An adjustable stepping motor 41 actuates a worm gear 42 engaging the gear 40. A thrust bearing 44 supports the gear 40 and piston 32 for rotation.

Figure 7:
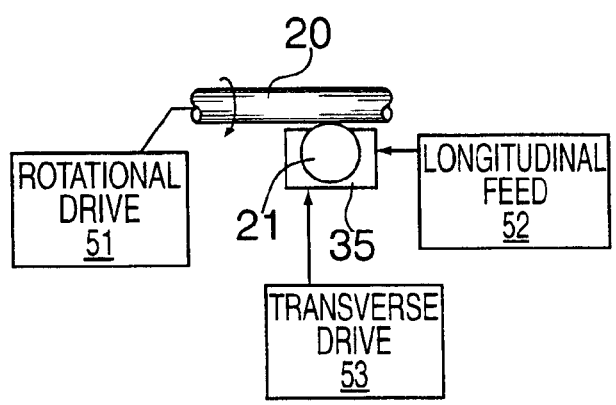
FIG. 7 is a fragmentary diagrammatic view, partially block diagram, showing the tool of FIGS. 5 and 5A in the environment of a lathe.

As illustrated in FIG. 7, the tool 21 and its movable support provisions 35, in accordance with the present invention, may be used in the environment of a conventional machine tool, such as a lathe having a rotational drive 51 for rotating the workpiece 20. A longitudinal feed 52 effects relative movement (feed) between the tool 21 and the workpiece 20. A transverse drive 53 forces the tool 21 into cutting engagement with workpiece 20 and thus establishes the arc of engagement between the cutting surface and the workpiece as illustrated in FIG. 5. Of course, whether in the setting of a lathe or other machine tool suitable for hard machining or hard turning, drives like those drives 51, 52 and 53 diagrammatically indicated in FIG. 7 can be conventional drives as known to those skilled in the art and suitable for turning, lapping, milling or other machining operations.

The foregoing, preferred embodiment of the invention described above should not be understood to limit the spirit and scope of the invention as set forth in the appended claims. For example, those skilled in the art will recognize that other means for supporting and moving the tool can be employed to bring a fresh, unworn portion of cutting edge in cutting relation with the workpiece.

What is claimed is:

1. A process of hard machining a hardened workpiece comprising:
   (a) providing a hard machining tool having a cutting edge extending substantially along a path of tool translation,
   (b) engaging a first portion of the cutting edge of the tool with the workpiece,
   (c) moving the hardened workpiece relative to the tool to effect cutting of the workpiece, and
   (d) moving the cutting edge of the tool substantially along said path to bring into cutting position a fresh portion of said cutting edge; the step of engaging a first portion of the cutting edge with the workpiece comprising engaging the cutting edge and the workpiece along a line of engagement that includes a location of comparatively coarse cutting and a location of finishing cutting, and said steps of moving the cutting edge of the tool comprising moving the cutting edge sufficiently to replace the cutting edge in the location of finishing cutting with the fresh portion of cutting edge and to move the cutting edge that has been in the location of finishing cutting into engagement with the workpiece in the location of comparatively coarse cutting.

2. The process according to claim 1, wherein the step of providing a tool comprises providing a tool of hard machining tool material.

3. The process according to claim 2, wherein the step of providing a tool comprises providing a tool of ceramic tool material.

4. The process according to claim 2, wherein the step of providing a tool comprises providing a tool of carbide tool material.

5. The process according to claim 1, in which the cutting edge of the tool is substantially arcuate, the step of engaging a first portion of the cutting edge with the workpiece includes engaging the cutting edge and the workpiece in cutting relation over an arc of contact of greater than 10° and said step of moving the cutting edge of the tool comprises moving the tool through an arc of less than 5°.

6. The process according to claim 1, wherein the cutting edge is substantially circular, the step of moving the cutting edge of the tool comprises rotating the tool to bring into cutting position in the location of finishing cutting the fresh portion of the cutting edge.

7. The process according to claim 1, wherein the cutting edge is a continuous curvilinear edge, said step of moving the cutting edge comprising translating the tool through an angle to bring into cutting position a fresh portion of said cutting edge immediately adjacent to the first portion of the cutting edge.

8. The process according to claim 7, wherein the cutting edge extends along a path that is circular and said step of moving the cutting edge comprises rotating the tool about an axis passing through a point on which the circular path is centered.

9. The process according to claims 8, wherein the step of moving the cutting edge comprises rotating the tool through an angle less than 1°.

10. The process according to claim 1, herein the step of providing a tool comprises providing a tool having a cutting edge with a radius of curvature greater than ⅛ inch (9.32 cm.) where the cutting edge engages the workpiece, and the step of engaging the first portion of the cutting edge with the workpiece comprises moving the cutting edge relative to the workpiece at a feed rate in excess of 0.003 in. (0.0076 cm.) per revolution of the workpiece.

11. The process according to claim 1, wherein the step of moving the workpiece relative to the tool comprises rotating the workpiece while moving the tool in a feed direction along the rotating workpiece generally parallel an axis of rotation of the workpiece at a rate of feed f, the step of engaging a first portion of the cutting edge with the workpiece comprises cutting the workpiece to a depth d, the value of the depth d in linear units being at least 10 times the value of the rate of feed f in linear units per revolution of the workpiece.

12. A process of hard machining a hardened workpiece including the steps of:

(a) rotating the hardened workpiece,
(b) bringing into cutting contact with the rotating workpiece a portion of a circular cutting edge of a hard machining cutting tool,
(c) feeding the cutting tool along the rotating workpiece,
(d) effecting angular movement of the cutting tool in a direction to replace with a new cutting edge portion a part of the cutting edge portion in contact with the rotating workpiece in substantially only a location of tool engagement affecting the finish of the machined workpiece, whereby wear on the cutting tool is substantially prevented from causing finish deterioration.

13. The process according to claim 12, wherein step (b) comprises bringing a portion of a cutting edge of ceramic tool material into contact with the rotating workpiece.

14. The process according to claim 12, wherein step (b) comprises bringing a portion of a cutting edge of carbide tool material into contact with the rotating workpiece.

15. The process according to claim 12, wherein the step of effecting angular movement of the cutting tool comprises repeatedly rotating the cutting tool through an angle of less than 1° to replace a finish cutting part of the portion of cutting edge in engagement with the workpiece while moving a worn finish cutting part of the portion of cutting edge into a rough cutting part of the portion of cutting edge in engagement with the workpiece.

16. Apparatus for hard machining a hardened workpiece including a hard machining cutting tool having a cutting edge extending along a path of translation, means for engaging the tool with the workpiece, means for imparting cutting relative movement between the workpiece and the tool with a cutting portion of the tool engaging the workpiece to define a rough cutting part of the cutting portion at a rough cutting location and a finish cutting part of the cutting portion at a finish cutting location, a support for the tool and a drive connected with the support to move the support to thereby move the cutting edge of the tool along the path of translation sufficiently to move a fresh, unworn portion of cutting edge to replace a wearing finish cutting part of the cutting portion of the cutting edge and to move the wearing finish cutting part of the cutting portion into the rough cutting location, thereby to substantially reduce workpiece finish deterioration as a result of wear on the cutting edge of the tool at the finish part of the cutting portion.

17. The apparatus according to claim 16, wherein said cutting tool is of hard machining material.

18. The apparatus according to claim 17, wherein said cutting tool is ceramic.

19. The apparatus according to claim 17, wherein said cutting tool is carbide.

20. The apparatus according to claim 16, wherein said tool is generally cylindrical and is configured to provide said cutting edge as a generally circular edge of the tool, to the support includes a rotational part supporting the generally cylindrical tool for rotation, and said drive comprises a motor connected to the support to rotate the rotational part through an angle sufficient to move the cutting edge along the path of translation to effect the replacement of the wearing part of the edge of the finish cutting part.

21. The apparatus according to claim 16, wherein said cutting edge is a continuous curvilinear edge extending along said path of translation, said support and drive being movable angularly to move the edge along said path of translation.

22. The apparatus according to claim 21, wherein the cutting edge has a radius of curvature in excess of 1/8 inch (0.32 cm.), and further comprising means for rotating the workpiece, and means for feeding the tool relative to the workpiece at a feed rate in excess of 0.003 in. (0.0076 cm.) per revolution.

23. The apparatus according to claim 16, wherein the cutting edge of the tool is substantially circular, the support being mounted for rotation and the drive connected with the support is an angular drive effecting rotation of the support and the tool.

24. The apparatus according to claim 16, wherein the cutting edge extends along a path that is circular and the drive connected to the support is a rotary drive rotating the tool about an axis passing through a point on which the circular path is centered.

25. The apparatus according to claim 24, wherein said drive connected to the support comprises means for incremental rotation of the tool through an angle less than 1°.

26. Apparatus for hard machining a hardened workpiece including a hard machining cutting tool having a cutting edge extending along a path of translation, a support for the tool and a drive connected with the support to move the support to thereby move the cutting edge of the tool along the path of translation, means for imparting relative cutting movement between the tool and a workpiece, and means for forcing the tool into cutting engagement with the workpiece along a line of engagement that includes a finishing cut portion of the line of engagement, said drive for the support comprising an angular drive providing translational movement of the tool to replace the cutting edge of the tool with a fresh, unworn portion of cutting edge in the finishing cut portion of the line of engagement and to move the used finishing cut portion into a location of a coarse cutting portion, thereby to substantially reduce finish deterioration as a result of wear on the cutting edge of the tool.

27. The apparatus according to claim 26, wherein the line of engagement between the cutting edge of the tool and the workpiece is arcuate, said support and cutting tool being mounted for angular movement, said drive for the support comprising an angular drive connected to the support for moving the support and the tool through an angle sufficient to effect replacement of the cutting edge in the finish cut portion of the line of engagement and to move the used finishing cut portion into the location of the coarse cutting portion.

28. The apparatus according to claim 26, wherein the cutting edge is arcuate, said means for forcing the tool into cutting engagement causing engagement of the cutting edge and the workpiece along a line of engagement that is an arc of greater than 10°, said drive connected with the support comprising an angular drive effecting an angular movement of the tool less than 5°.

29. The apparatus according to claim 26, wherein said means for imparting relative cutting movement between the tool and a workpiece comprises a feed drive imparting a rate of feed f, and said means for forcing the tool into cutting engagement comprises a tool engagement drive moving the cutting edge of the tool to effect a cut of depth d, the depth d in linear units being at least 10 times the value of the rate of feed f in linear units per rotation of the workpiece.

30. The apparatus according to claim 26, wherein the hard machining culling tool has an arcuate cutting edge extending along an arcuate path of translation, the arcuate cutting edge having a relatively large radius of curvature, the tool cutting edge being of a ceramic hard cutting material of relatively low thermal conductivity, the relatively large radius of curvature of the cutting edge and the relatively low thermal conductivity of the ceramic hard cutting material retarding the flow of heat from the higher heat producing comparatively coarse cutting portion into the lesser heat producing finishing cut portion of the line of engagement, thereby to reduce the rate-of deterioration of the cutting edge in the finish cut portion of the line of engagement.

* * * * *

UNITED STATES PATENT AND TRADEMARK OFFICE
CERTIFICATE OF CORRECTION

PATENT NO. : 6,733,365 B1
DATED : May 11, 2004
INVENTOR(S) : Shaw et al.

It is certified that error appears in the above-identified patent and that said Letters Patent is hereby corrected as shown below:

<u>Title page,</u>
Item [*] Notice, delete "153" and insert -- 304 --.

Signed and Sealed this

Thirtieth Day of August, 2005

JON W. DUDAS
*Director of the United States Patent and Trademark Office*